United States Patent [19]

Thomason

[11] 4,100,751
[45] Jul. 18, 1978

[54] CONTINUOUS CONCRETE PIPE LAYING MACHINE

[76] Inventor: Larry V. Thomason, 4196 E. Herndon, Clovis, Calif. 93612

[21] Appl. No.: 764,118

[22] Filed: Jan. 31, 1977

[51] Int. Cl.² .................. F16L 1/02; E02D 29/10
[52] U.S. Cl. .......................................... 61/72.2
[58] Field of Search ............. 61/72.2, 105, 72.4, 61/72.6; 425/59, 63, 64, 200, 431; 37/DIG. 18; 172/40; 264/31; 249/10; 214/77 R

[56] References Cited

U.S. PATENT DOCUMENTS

| 2,406,025 | 8/1946 | Moor | 61/72.2 X |
| 2,731,698 | 1/1956 | Tunsen | 61/72.2 |
| 2,937,429 | 5/1960 | Livingston | 61/72.2 X |
| 3,106,760 | 10/1963 | Tunsen | 425/59 |
| 3,113,364 | 12/1963 | Blixt | 425/59 |
| 3,205,550 | 9/1965 | Martin | 425/59 |
| 3,252,198 | 5/1966 | Fuller | 425/59 |
| 3,785,759 | 1/1974 | Johnson et al. | 425/59 |

*Primary Examiner*—Dennis L. Taylor
*Attorney, Agent, or Firm*—Townsend and Townsend

[57] ABSTRACT

A machine for laying continuous concrete pipe in an open trench. The machine has interior and exterior pipe forming molds about which fresh concrete is poured. Reciprocating flexible diaphragms compact concrete poured in the trench adjacent the trench bottom to prevent the formation of voids without causing vibrations. The exterior mold has surfaces in continuous contact with side walls of the trench to thereby guide the mold aong and center them with respect to the trench. The interior mold includes a plurality of arcuate forms which remain in place after the pipe has been formed until the concrete has hardened. The forms are spread apart so that the finished pipe is slightly oblong in a horizontal plane. Pipe spreaders support the forms in their spread configuration while the concrete hardens and spreaders contact an inside of the forms at multiple contact points arranged so that the spreader can be pivoted into a position in which it contacts the form at no more than two points to facilitate the removal of the spreaders from the finish hardened pipe. Variable speed concrete tampers are positioned below a concrete intake hopper to facilitate the feeding of fresh concrete from the hopper to the bottom of the trench. A rocker arm reciprocates the tampers and is positioned beneath the exterior mold means. The hopper is removable and when done the high point of the pipe laying machine protrudes less than 4 inches above the top surface of the exterior mold, allowing the pipe laying machine to pass beneath utility lines and the like crossing the trench provided the clearance between the line and the top of the exterior mold does not exceed 4 inches or that such clearance can be gained by a temporary deviation of not more than 4 inches from the established grade of the pipe line.

27 Claims, 6 Drawing Figures

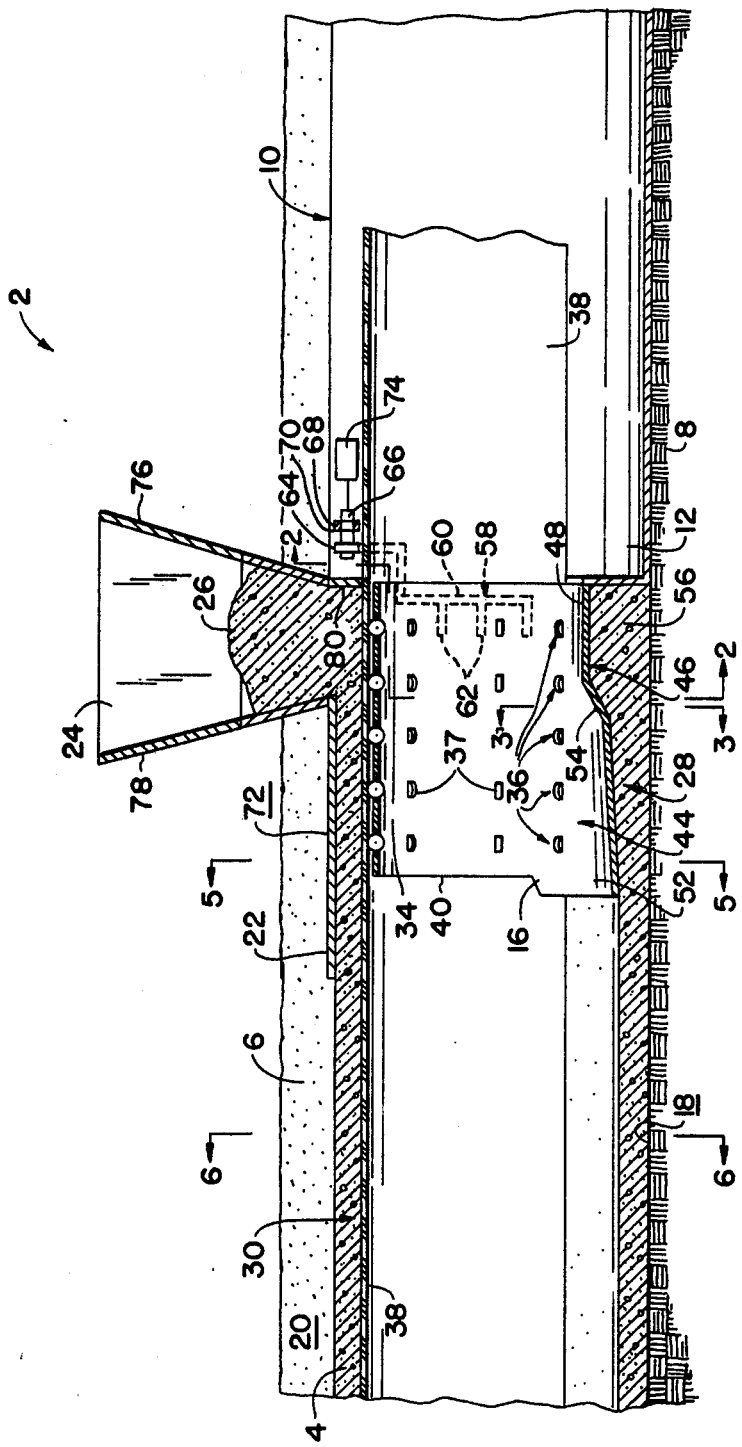
FIG._1.

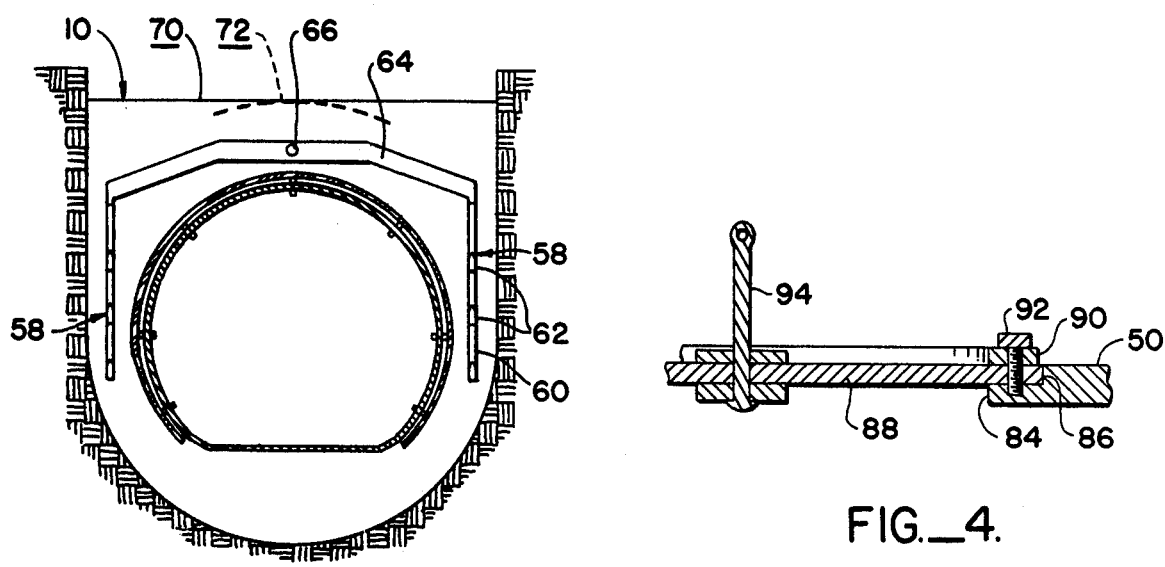
FIG.\_2.
FIG.\_4.
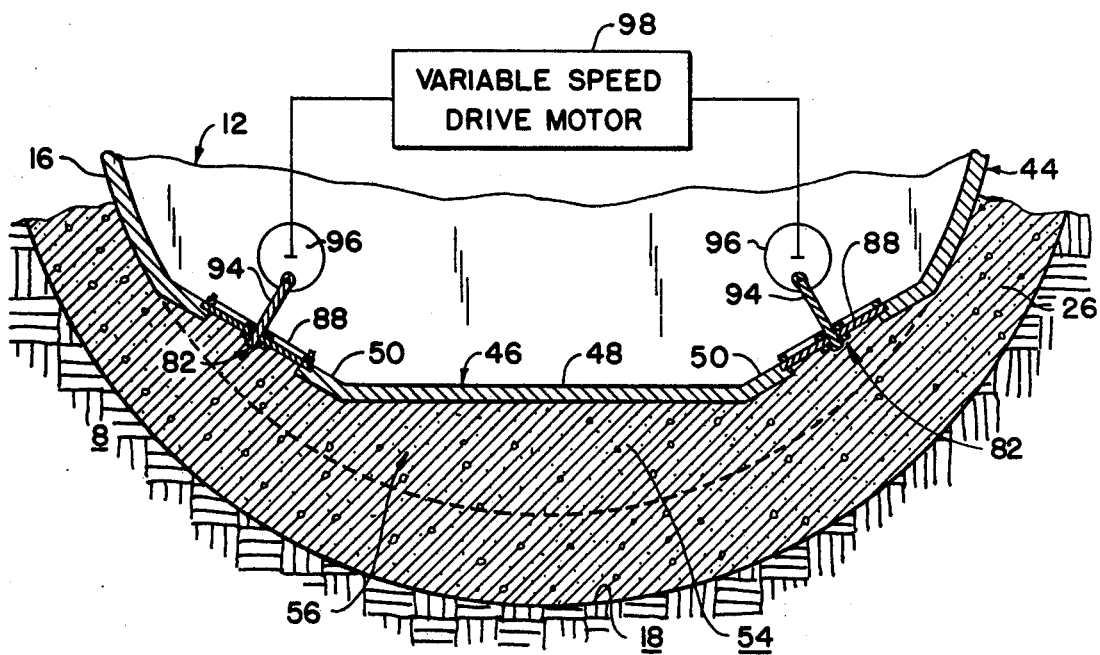
FIG.\_3.

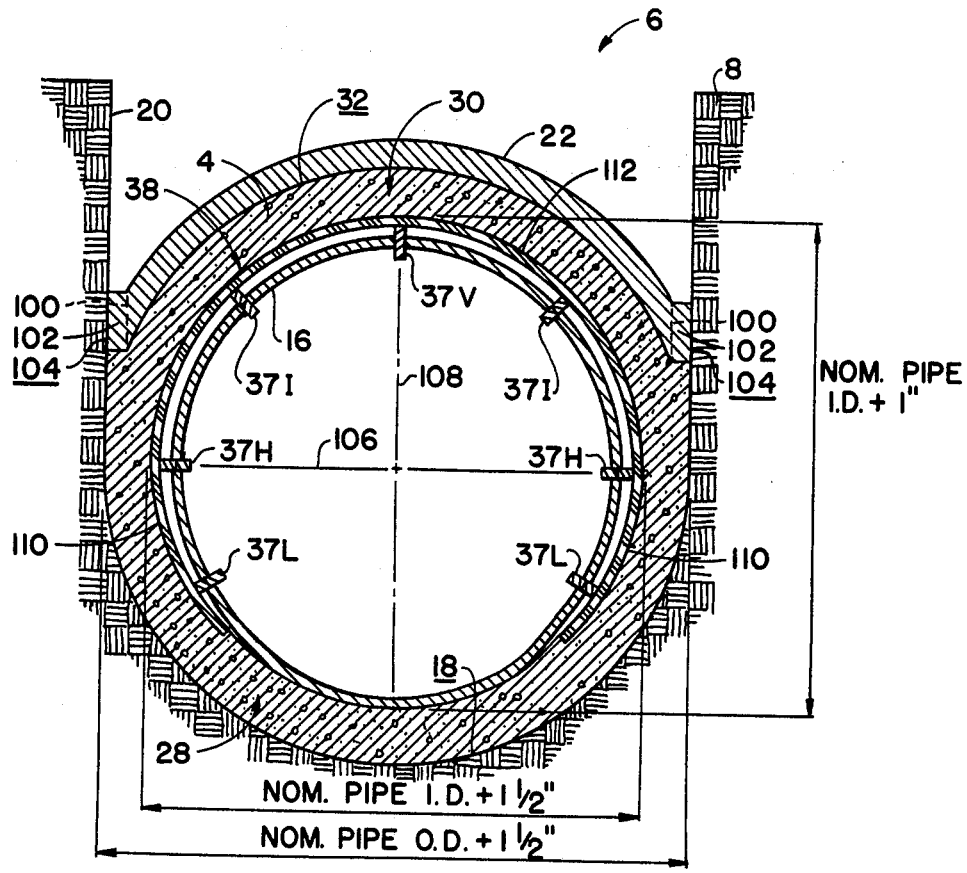
FIG._5.
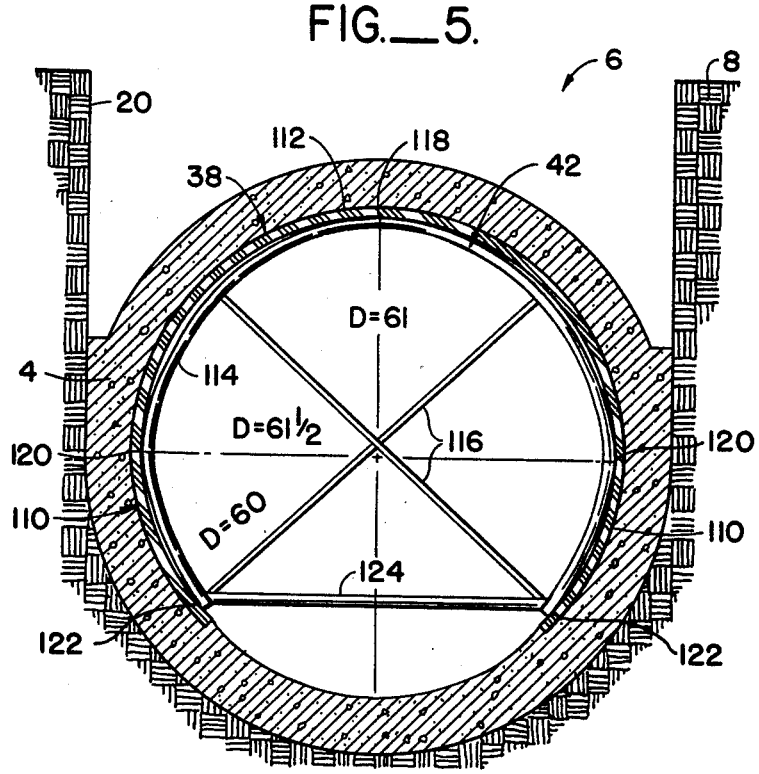
FIG._6.

CONTINUOUS CONCRETE PIPE LAYING MACHINE

BACKGROUND OF THE INVENTION

The in situ production of continuous, jointless concrete pipe in open trenches is now widely accepted. It yields high-quality pipe at modest costs. Under one method pipe is produced by employing the bottom of an open trench as the supporting medium for the lower pipe half while forms are provided to support the upper pipe half until the concrete has hardened. The forms are relatively short lengths of metal sheets having a curved shape complementary to the interior curvature of the pipe. After the concrete has hardened, the forms are removed by workmen who enter the pipe, release the forms and then remove them by dragging them to the open end of the pipe. Methods and apparatus for constructing such pipe are described, for example, in U.S. Pat. Nos. 2,731,698; 3,106,760; 3,113,364; and 3,534,449. U.S. Pat. No. 3,785,759 proposes to delete interior pipe forms for supporting the upper pipe half while the concrete hardens. As far as is known to applicant, the method proposed in the last mentioned patent is technically and/or economically not feasable and has not been employed on a commercial scale.

Although the method and machines proposed in the above patents have resulted in the development of an effective technique for making and installing large diameter concrete pipe in a single operation they are subject to disadvantages and shortcomings. For example, with increasing pipe diameters the slump of the concrete mix must be decreased to prevent a collapse of the freshly poured concrete pipe before the concrete has hardened. Such an increasingly dry mix, however, results in reduced flow rates of the concrete which, in turn, can lead to the formation of voids. With prior art machines this is prevented by vibrating the freshly poured concrete with electrically actuated vibrators which are either manually operated or attached to sides of the pipe laying machine. In an open trench this practice has drawbacks since it can loosen the surrounding soil, particularly if it is sandy soil. Once the soil is loosened it flows to the bottom of the trench where it fills spaces that should be filled with concrete, forming discontinuities in the concrete which reduce effective wall thicknesses of the pipe that can lead to premature pipe failures. Moreover, the practice of vibrating the concrete with vibrators attached to the machine, as is done in prior art machines, subjects the whole machine, including the molding sections thereof together with the forms and spreaders, to vibrations which are transmitted to the freshly poured concrete pipe, sometimes resulting in movement of the concrete and the formation of cracks in the crown of the pipe before the concrete is fully set.

A further shortcoming of prior art continuous concrete pipe laying machines was the fact that the trench had to be made oversize to enable the movement of the machine through the trench. The forward end of the machine, frequently referred to as the "sled", was adequately guided along and centered by the vertical sides of the trench. However, the aft portion of the machine, which includes the concrete forming molds, that is the interior mandrel including an interior, lower concrete trowelling plate and the exterior mold, or the upper trowelling plate, which shapes the upper exterior surface of the pipe, was largely unsupported by the side walls. Consequently, the aft portion of the machine, and therewith, the molds could move laterally relative to the trench sides. This in turn resulted in corresponding, highly undesirable variations in the wall thickness. To assure a minimum design wall thickness, the average wall thickness, therefore, had to be larger than the minimum design wall thickness. This resulted in a substantially larger concrete consumption for laying the pipe than would be necessary if such lateral mold movements did not take place.

Another shortcoming of the prior art relates to the problem of removing the forms and spreaders from the freshly formed pipe after the concrete sets and hardens. Presently, this requires considerable time and effort which renders the operation costly. The present invention modifies the spreaders to render this operation easier and faster to perform.

An additional and costly shortcoming of the prior art concrete pipe laying machine is the fact that portions of the machine, particularly the concrete receiving hopper, protrude well above the top exterior surface or crown of the pipe being poured. This causes problems whenever the established grade of the pipe line requires the pipe to be laid beneath crossing utility lines and the like unless the clearance between the obstacle and the crown of the pipe is at least about 12 inches, the approximate height that the machine high point above the pipe crown.

Since general engineering practice does not allow even temporary deviations of more than 4 inches from the established grade, whenever the clearance below the obstacle, utility line of the like is greater than 4 inches, it is necessary to discontinue the concrete pouring process, lift the machine from the trench, replace it in the trench on the other side of the obstacle, and then resume the concrete pouring process. The intermediate section of the pipe line between the two poured sections has to be completed with pre-cast concrete pipe or the like.

This is obviously a time consuming and costly operation. Depending on the size of the pipe being poured, such costs can run as hgih as or higher than $1,000 per discontinuity.

SUMMARY OF THE INVENTION

The present invention provides an improved continuous concrete pipe laying machine which overcomes the above discussed shortcomings found in prior art machines of the this type and which provides additional improvements as is now fully discussed below.

Generally speaking, continuous length concrete forming machines require an open trench having upright sides and a semi-circular trench bottom which supports the pipe to be laid. The machine itself is drawn longitudinally through the trench in a forward direction. It includes a sled which defines a forward end of the machine, which is tub-shaped, houses a motor for driving various components of the pipe forming machine and which provides space for one or more workmen.

The actual pipe forming portion of the machine comprises a tubular mandrel or interior mold which is spaced from the bottom of the trench, a hopper for receiving fresh concrete, and means for guiding the fresh concrete into the spaced surrounding the mandrel. The mandrel itself is attached to the sled, trails it, and forms or trowels the lower half of the usually substantially cylindrical inside of the pipe. The outside of the lower pipe portion is supported and formed by the trench side and bottom while the upper half of the pipe interior is formed by multiple, generally semi-cylindrical forms. An upper exterior surface of the pipe is formed by an exterior mold or upper trowel plate which is spaced from the mandrel and the forms, a distance equal to the desired wall thickness of the pipe and which extends generally coaxially to the mandrel over the substantially full length thereof.

In operation the sled is drawn via a cable or the like through the trench while fresh concrete is continuously poured into the hopper and thereby about the mandrel. The relatively thin forms support the upper pipe half until the concrete has hardened and they are continuously placed over the upper half of the mandrel so that the fresh concrete is poured onto the forms. The forms remain stationary relative to the freshly poured concrete and as each form leaves the mandrel a specially designed "hoop spreader" is inserted into each form to maintain the form in its semi-circular configuration until the concrete has hardened. A workman thereafter releases the spreader from its supportive contact with the form and the several spreaders and forms are withdrawn from the pipe by pulling them to the open end of the pipe before the start of the next pour, from where they are lifted from the trench and readied for their next use.

One aspect of the present invention relates to the manner in which the freshly poured concrete is compacted or consolidated as it is formed into pipe. With pipe of larger diameters, it is necessary to use concrete mixes of increasingly dry character which it is difficult to flow into cavities, particularly in the space below the specially designed mandrel. Instead of employing vibrators which cause the above discussed undesirable side effects, the present invention provides pumping and consolidating means that are mounted generally to the mandrel and which continuously compress and agitate the freshly poured concrete disposed in the space between the mandrel and the bottom and sides of the trench. Means is provided for operating these concrete pumping and agitating means at a variable but sufficiently flow rate of speed to prevent the loosening of dirt and sand in the trench, and to prevent vibrations of the mandrel which, in turn, could be transmitted to the freshly poured pipe and result in cracking the crown of the pipe. The pumping means itself is defined by a flexible diaphragm, constructed of reinformed rubber or the like, for example, which is mounted to a correspondingly shaped hole in the interior mold and which is driven via a reciprocating rod secured to a center of the diaphragm and actuated with an eccentric drive coupled to the hydraulic motor.

The provision of the diaphragm concrete pump is particularly important for machines laying concrete pipes of a diameter of 42 inches or more because such relatively large pipe diameter requires rather dry concrete mixes. However, the benefits obtained from the diaphragm concrete pump of the present invention are equally applicable to smaller pipe sizes. The gentle, vibrationless pumping action of the diaphragm avoids the loosening of soil, even sandy soil from the trench walls such as would form sand pockets and/or uneven exterior surfaces due to accumulations of soil or sand in the trench bottom before the concrete fills it. This contributes to assuring a uniform pipe wall thickness at the trench bottom with resultant uniform pipe strength and the avoidance of premature pipe failures.

The elimination of vibration throughout the whole of the pipe laying machine, such as characterizes the operation of prior art machines, also avoids the possibility of transferring such vibrations to the forms and to the freshly poured pipe with the possibility of resultant adverse effects therefrom to the pipe before the concrete has hardened.

Another aspect of the present invention relates to the centering of the mandrel and the exterior mold or upper trowelling plate with respect to the trench. As is customary, the trench is dug approximately 1½ inches wider than necessary to accommodate the pipe forming machine therein so that it can be readily dragged along the trench. This oversize trench, however, allowed the mold to move laterally with respect to the trench sides which correspondingly increased and decreased the lateral pipe wall thickness. Since pipe is designed for a given minimal wall thickness the average thickness of the pipe must be maintained larger than that to account for the possible lateral mandrel movements. To eliminate the need for making the average pipe wall thicker than necessary the present invention provides an upper trowelling plate which includes laterally spaced apart mold guide surfaces positioned to substantially simultaneously engage the sides of the trench as the sled is drawn therealong. The guide surfaces have a sufficient length and height to center the mold with respect to the trench so that relative lateral movements between the mold and the trench are eliminated and corresponding variations in the wall thickness of the finished pipe are prevented. The introduction of these guide surfaces on the outer side surfaces of the mandrel has resulted in a substantial reduction in the volume of concrete required per linear foot of pipe poured. This is particularly true in the case of large diameter pipe.

The exterior mold guide surfaces are spaced apart a distance equal to the width of the trench, normally 1½ inches wider than the nominal exterior pipe diameter so that the guide surfaces rub along the trench sides. In the preferred embodiment of the invention the upper trowel plate is a relatively thin, arcuately shaped plate and the guide surfaces are defined by elongate, straight wear bars secured, e.g. welded to lateral sides of the trowel plate. Furthermore, the wear bars extend over the full length of the trowel plate, which in turn is of a length about equal to the length of the mandrel so that a relatively long bearing surface is assured and wedging of the trowel plate and therewith of the mandrel is prevented. In this manner the mandrel which forms the interior pipe surface, is drawn concentrically along the trench.

Another aspect of the invention goes hand-in-hand with the provision of the lateral mold guide surfaces. Although the exterior dimension of the pipe, particularly in its horizontal center plane is larger than necessary because the trench is oversize, e.g. 1½ inches wider than nominally necessary, the wall thickness is maintained substantially equal to the theoretical wall thickness by increasing the inner diameter (I.D.) of the pipe. In accordance with the present invention, the I.D. of the pipe in the horizontal center plane is increased by the theoretical oversize of the trench, e.g. by 1½ inches while the pipe I.D. in the vertical center plane is maintained equal to the nominal pipe diameter or slightly larger, e.g. one inch oversize. The provision of such a slightly oversize pipe is normally fully acceptable to the specifying customers. By dimensioning the pipe I.D. in this manner, the present invention does not require an average pipe wall thickness which is larger than the specified minimum wall thickness. This feature of the invention saves as much as 1 to 1½% and more concrete. Additional concrete saving ar provided because the lateral mold guide surfaces in engagement with the trench sides prevent the so-called "boil over" of concrete as the machine is drawn through the trench. Such boil over was commonly encountered with prior art pipe forming machines and represented wasted concrete.

To achieve the oversize and slightly oblong interior pipe surface configuration, the present invention constructs the upper portion of the mandrel (which receives the removable semi-cylindrical forms that support the upper portion of the pipe while the concrete hardens) with a plurality of rollers the periphery of which is unequally spaced from the center of the pipe and, therefore, of the mandrel to shape and support the forms in a slightly oblong configuration, that is a configuration in which the pipe width in the horizontal center plane is somewhat larger than the pipe height in the vertical center plane of the pipe. The rollers can rotate about axes which are perpendicular to the trench and to the pipe radius and which have the desired distance from the pipe center. Thus, the roller proximate the uppermost portion or crown of the pipe is slightly closer to the pipe center than the roller proximate the horizontal center plane of the pipe to form, for example, a pipe having a width which is 1½ inches greater than the nominal pipe I.D. and a height which is 1 inch larger than the nominal pipe ID.

The rollers greatly facilitate the ease with which the forms (which remain stationary with respect to the freshly poured concrete) can move relative to the mandrel. To prevent concrete from adhering to the rollers the latter preferably have a periphery constructed of an elastomeric material such as rubber, plastic or the like to which hardened concrete does not readily adhere.

A further improvement provided by the present invention contemplates the extension of the removable pipe form past that is below the horizontal center plane of the pipe. This lower section of the form is given a degree of curvature greater than the degree of curvature of the upper portion of the form. One or more rollers located below the horizontal center plane support and appropriately position the lower section of the form on the mandrel.

The increased curvature of the lower form section of the form provides a better support for the concrete while it hardens and further aids in the removal of the necessary form supporting spreader. The spreader is a hoop constructed so that it contacts the form at a first point which is at about the intersection between the vertical pipe center plane and the inside of the form, at second and third points which are at the intersection between the form and the horizontal center plane of the pipe, and at fourth and fifth points located at the lower form sections having increased curvature. While this hoop spreader provides a multi-point, firm support for the mold it is readily removed by pivoting it about the horizontally aligned second and third points which disengages all other contact points between the spreader and the form. Thereafter, the spreader can be pivoted about a generally horizontal axis to disengage the second and third contact points for the ready removal of both the spreader and the pipe supporting form. Thus, the hoop spreader of the present invention provides a strong and secure multi-point support for the form distributed over substantially their full peripheral extent. Nevertheless, the removal of the hoop spreader of the present invention is much more simple than the removal of prior art spreaders.

Yet another aspect of the present invention relates to the ability of the pipe forming machine to clear utility lines that may cross the trench. For that purpose, the concrete receiving hopper into which fresh concrete is poured is made in two pieces and is demountably secured to the machine so that it can be removed while the machine passes under a utility line, sewer or the like. In addition, concrete tampers provided for forcing concrete in a downward direction from the hopper into the space between the mandrel and the trench side walls are mounted so that both the tampers and the drive mechanism therefore protrude no more than 4 inches above the upper trowel plate or exterior mold. In this manner the required vertical clearance above the pipe crown to clear a crossing utility line equals the thickness of the upper trowel plate which normally does not exceed a few inches. In almost all instances sufficient clearance is available, or can be obtained by a temporary deviation of not more than 4 inches from the established grade of the pipe line so that the heretofore necessary removal of the pipe laying machine from the trench (on account of need for greater clearance below such obstacles) is eliminated. This eliminates delays and other expenses encountered all too often by operators using prior art pipe laying machines. Cost savings of up to $1,000 and more, depending the size of the pipe laying machine, can be realized for each such crossing in which the discontinuance of the pipe pouring process is avoided.

In sum and substance therefore, the present invention provides a continuous pipe laying machine which includes numerous improvements over the prior art, all of which are directed to reducing the cost of such pipe while improving the quality of the pipe laid and in particular, eliminating undesirable weaknesses in the pipe walls, excessive variations in the wall thickness and the like and wasteful use of concrete.

BRIEF DESCRIPTION OF THE DRAWINGS

FIG. 1 is a schematic side elevational view, in section, illustrating the overall construction of a continuous concrete pipe laying machine constructed in accordance with the present invention;

FIG. 2 is a fragmentary, front elevational view, in section, taken on line 2—2 of FIG. 1;

FIG. 3 is an enlarged, rear elevational view, in section, of a lower portion of the concrete pipe forming machine illustrated in FIG. 1 taken along line 3—3 of FIG. 1;

FIG. 4 is an enlarged, fragmentary detail illustrating the construction of a diaphragm concrete pump constructed in accordance with the present invention;

FIG. 5 is an enlarged, schematic, rear elevational view, taken along line 5—5 of FIG. 1, and illustrates both the construction of the machine in greater detail and the configuration given the pipe in accordance with the present invention; and FIG. 6 is a rear elevational view similar to FIG. 5, taken along line 6—6 of FIG. 1 and illustrates the manner in which a hoop spreader constructed in accordance with the present invention supports generally semi-cylindrical forms until the freshly poured concrete has hardened.

DESCRIPTION OF THE PREFERRED EMBODIMENTS

Referring to FIG. 1, a pipe forming machine 2 is illustrated for laying a continuous length of concrete pipe 4 in a generally U-shaped, open trench 6 in ground 8. The pipe forming machine comprises a sled 10 which has a generally U-shaped configuration complementary to that of the trench and which provides space for one or more workmen and which further houses auxiliary equipment such as a motor, a hydraulic pump, a power winch (not separately shown) and other equipment of minor importance for dragging the machine with the cable along the trench. The construction of the sled, as such, is old and does not form part of the present invention and is, therefore, not further described herein.

Connected to the aft end 12 of the sled is the actual pipe forming apparatus 14 which, broadly speaking, comprises a mandrel or interior pipe forming mold 16 of a generally cylindrical cross-section disposed coaxially within the trench, that is coaxially with respect to a semi-circular trench bottom 18 so that the mandrel is equally spaced from the centered in respect to trench sides 20. The pipe forming apparatus 14 further includes an upper trowelling plate or exterior mold 22 which is coaxially positioned relative to the mandrel and vertically spaced therefrom. A two-part hopper 24 into which fresh concrete 26 is poured extends upwardly from the mandrel and the upper trowelling plate and is constructed so that fresh concrete flows downwardly into a semi-annular space 28 between the lower half of mandrel 16 and the semi-cylindrical trench bottom 18 and into another, upper semi-annular space 30 between the upper mandrel half and the upper trowel plate 22.

In operation the sled is drawn in a forward direction, that is to the right as seen in FIG. 1, and fresh concrete is poured into hopper 24 so that it flows into the two semi-annular spaces 28, 30 to thereby form pipe 4. As is best illustrated in FIG. 5, trench bottom 18 as well as parts of upright trench sides 20 comprise the support for the pipe and they simultaneously form the exterior surfaces of the lower portion of the pipe. An upper exterior surface 32 of the pipe is formed by upper trowelling plate 22.

Referring now to FIGS. 1, 3 and 5, mandrel 16 comprises an upper mandrel half 34 which has a generally semi-circular configuration and which extends forwardly to about the aft end 12 of sled 10. The mandrel includes a plurality of roller sets 36, each set having five circumferentially arranged rollers 37, for example, which are rotatably mounted to the inside of the mandrel. The peripheral surface of these rollers is defined by an elastomeric material which prevents adherence of the concrete to the rollers and lessens vibrations caused by the passage of the forms over the rollers. Cut-out spaces in the mandrel correspond to the locations of the rollers, allowing portions of the rollers to extend inside the shell of the mandrel so that only the peripheral surfaces of the rollers are disposed on the outside of the mandrel. The axis of each roller is disposed peripendicular to the radius of the pipe and, therewith, of the mandrel and perpendicular to the direction of movement the pipe forming machine through the trench as is best illustrated in FIG. 5. A workman positioned in sled 10 continuously feeds generally semi-cylindrical forms 38 over the upper mandrel half as the pipe forming machine advances through the trench by placing such forms over the portion of the mandrel immediately adjacent aft end 12 of the sled.

Each form is of a convenient, readily handled length, say 4 to 6 feet long and is constructed of relatively thin, e.g. ⅛ to ¼ inch thick metal such as aluminum. The forms are hooked together end to end as the pipe forming machine advances in the trench, the forms are dragged rearwardly relative to the mandrel over the periphery of the rollers so that the forms remain stationary with respect to the trench and the pipe. Accordingly, fresh concrete 26 from hopper 24 flows about the exterior of the forms which, therefore, define the upper portion of the interior pipe surface and support the upper pipe half until the concrete has hardened and the pipe becomes self-supporting. Before each form leaves an aft end 40 of the upper mandrel half 34 a workman places a hoop spreader 42 (shown in FIG. 6 only) into the concave inner side of the form which maintains the form in the spread apart configuration as determined by the form supporting peripheries of the rollers 37. The hoop spreader remains in place until the concrete has fully hardened.

The lower mandrel half 44 is defined by a first, forward portion 46 which has a generally horizontal bottom plate 48 that is spaced some distance above trench bottom 18 and which is contiguous with lateral, angularly inclined side plates 50. The side plates in turn are joined to the upper mandrel half 34.

A second, aft portion 52 of the lower mandrel half has a generally semi-cylindrical configuration and a diameter and shape equal to the desired inside diameter and shape of the finish formed pipe. A sloping face plate 54 interconnects the horizontal and side plates 48, 50 with the cylindrical aft portion 52 of the mandrel. Thus, the horizontal and side plate 48, 50 define an enlarged chamber 56 into which fresh concrete 26 flow from hopper 24. As the machine moves along the trench the concrete in the chamber is formed into a cylindrical shape. Sloping face plate 54 as well as the semi-cylindrical aft portion 52 of the lower mandrel half 44 act as a lower trowelling plate which spread the fresh concrete and give it the desired shape.

Summarizing now briefly the pipe forming operation, it is apparent that fresh concrete entering through hopper 24 is shaped into continuous pipe by the trench bottom and parts of the trench sides 18, 20 respectively, which cooperate with the lower mandrel half 44 while the upper pipe half is formed by removable forms 38 carried on rollers 37 (which in turn are mounted to the upper mandrel half 34) in conjunction with the upper trowelling plate 22. While the trench supports the lower pipe half the upper pipe half is supported by the forms and the cooperating hoop spreaders until the concrete has hardened. Once the concrete has hardened, the spreaders are released from their supporting contact with the forms, as is more fully discussed below, and the spreaders and forms are pulled through the pipe to its open end for their subsequent reuse while laying additional pipe.

It will also be noted that the lower mandrel half 44 together with the form 38 and the form supporting upper mandrel half 34 form an interior mold about which the pipe is formed. The upper trowelling plate 22 forms the free, upper exterior surface 32 of the pipe and thus acts as an exterior mold for those portions of the pipe not supported (and formed) by trench bottom 18 and trench sides 20.

Referring now to FIGS. 1 and 2, tampers 58 are provided to facilitate the flow of concrete from hopper 24 to the concrete receiving chamber 56. The tampers are defined by an upright, relatively narrow, e.g. flat iron bar 60 from which a plurality of spaced apart, horizontal fingers 62 extend. A yoke 64 is rigidly secured to a pivot shaft 66 pivotally mounted to an end wall 68 at aft end 12 of sled 10. An upper edge 70 of the end wall (as well as the remainder of sled 10) is horizontally aligned with or below an upwardly facing surface 72 of upper trowel plate 22. The yoke is constructed so that it too is either in horizontal alignment or disposed below the upwardly facing surface of the trowel plate. A motor 74 mounted to sled 10 and fitted with a suitable drive gear pivots shaft 66 and thereby yoke 64 to thereby substantially vertically reciprocate tampers 58. This reciprocating movement of the tampers helps to force fresh concrete down towards concrete receiving chamber 56.

Still referring to FIGS. 1 and 2, hopper 24 is constructed of two hopper sections 76 and 78. The sections are demountably secured to each other while the lower section 78 is demountably secured to a cross bar 80 of pipe forming apparatus 14 and a forward end of the upper trowelling plate 22. Bolts, clamps (not shown) or the like are employed for securing the hopper sections to each other and to the cross bar and the upper trowelling plate so that the hopper in its entirety or the upper portion 76 of the hopper can be removed. This feature of the present invention is important to enable the pipe forming machine 2 to clear most utility lines, sewers and the like crossing the trench adjacent the ground surface without having to lift the machine out of the trench and replace it at the other side of such line. Since neither the hopper, when fully removed, nor the tampers 58 or their driving mechanism including yoke 64, pivot shaft 66 and drive motor 74 and the sled 10 and its end wall 68 protrude more than a few inches above the upwardly facing surface 72 of upper trowelling plate 22, a trench crossing line must necessarily clear the crown of the pipe, the machine can be employed to continue laying pipe even beneath low clearance crossing sewage line without interrupting the continuity of the pipe laying process. As was briefly alluded to above, prior art concrete pipe laying machines of this type did not have such an ability because both the hopper and the drive mechanism for the tampers protruded well above the upper trowelling plate.

Referring now to FIGS. 1, 3 and 4, it is particularly difficult to homogenously compact fresh concrete in chamber 56 beneath horizontal bottom plate 48. The problem increases with increasingly dry concrete mixes such as must be used for large diameter pipe. To alleviate this problem, diaphragm concrete pumps and agitators 82 are installed in sloping side plates 50. For that purpose the side plates have circular cutouts 84 including an annular recess 86 into which is placed a flexible disc or diaphragm 88 constructed of reinforced rubber, plastic or the like. The periphery of the diaphragm is clamped to the side plates with a ring 90 and threaded bolts 92. A connecting rod 94 is secured to the center of the diaphragm with a pair of nuts threaded onto the end of the rod. The other end is pivotally connected to an eccentric drive 96 driven by a variable speed hydraulic motor 98. The construction of such motors and of the eccentric drive is well-known and therefore not further described herein.

In the preferred embodiment of the invention, the eccentric drive provides a stroke of about one to 1½ inches and the motor includes a continuously variable speed control so that the connecting rod 94 can be reciprocated at a rate of from zero to about 240 cycles per minute. It has been found that for most larger pipe diameters of 42 inches or more an operating speed of about 180 cycles per minute for the diaphragm pumps 82 is best.

The diaphragm pumps continuously agitate concrete flowing downward from the hopper (as aided by tampers 58) and thereby forces the concrete into spaces where voids might otherwise form. The low speed of the diaphragm pumps, however, prevents the occurence of vibrations which might loosen the soil in the trench walls allowing it to accumulate in the bottom of the trench causing irregularities and discontinuities in the bottom surface of the pipe wall. Reduction or elimination of vibration in the pipe laying machine avoids the possibility of such vibrations being transmitted to the forms and to the freshly poured pipe, thereby eliminating the danger of cracking the crown of the pipe.

The action of the diaphgram pumps continuously agitates concrete allowing it to flow downwardly from the hopper (as aided by tampers 58) and thereby forces the concrete into spaces where voids might otherwise form. The low speed of the diaphragm pumps, however, prevents the occurrence of vibrations which could loosen soil or cause a cracking of the freshly poured concrete.

Referring now to FIG. 1 and 5, it was previously indicated that the trench is normally slightly, e.g. one and 1½ inches wider than the nominal outside diameter of the pipe (which in turn is the nominal inside pipe diameter plus two times the minimum designed wall thickness for the pipe). To prevent lateral movements of the mandrel 16 as it is drawn through the trench, the upper trowelling plate should be at all times in substantial engagement with both upright trench sides 20. In the preferred embodiment of the invention this is accomplished by fitting the lateral ends 100 of the trowel plate with parallel, elongate guide bars 102 having trench side engaging outer guide surfaces 104 the spacing between which equals the distance between the trench sides. Preferably, the guide bars have a width of one to two inches to provide adequate guidance and to prevent the bars from cutting into the trench sides. Further, they extend over the full length of the upper trowelling plate, that is substantially to the aft end of the mandrel.

The guide bars 102 assure the proper alignment of the mandrel in the trench. Accordingly, the pipe wall thickness can be maintained at their designed minimum. To accomplish this purpose, rollers 37H, which lie in or proximate to the horizontal center plane 106 of the pipe, are positioned so that they locate form 38 in the horizontal center plane at the nominal pipe I.D. plus the trench oversize, e.g. plus one and 1½ inches. Similarly, the form supporting roller 37V which lies in the vertical center plane 108 of the pipe is located so that the form 38 is moved outwardly to define a slightly oversized vertical pipe dimension. This oversize may be selected to equal the horizontal oversize or it may be slightly less (resulting in a somewhat oblong pipe I.D.). In a preferred embodiment the vertical pipe I.D. is selected to be one inch larger than the nominal pipe I.D. Intermediate rollers 37I are spaced to assure a smooth and continuous form curvature between rollers 37C and 37H.

Referring now to FIGS. 1, 5 and 6, forms 37, so far referred to being "generally semi-cylindrical" extend over more than 180°, preferably over an arc of about 270°. The term "semi-cylindrical" as used herein and in the claims should be understood as including such or any other arc so long as the form is not a closed cylinder extending over 360°. Thus, the forms include lower sections 110 disposed below horizontal center plane 106. The degree of curvature of the lower form sections is larger than the degree of curvature of the upper form half 112 as is best seen in FIG. 6. Lower form support rollers 37L, mounted as previously discussed, are positioned so that they accommodate this increased curvature while fully supporting the lower form sections 110. The increased curvature of the lower form section has a dual purpose. First, after the form leaves the mandrel and while it supports the still soft upper pipe half the increased degree of curvature provides a better support for the form. Secondly, the increased curvature better accommodates the anchoring of the hoop spreader 42 and its subsequent removal.

The hoop spreader 42 is constructed of an arcuately shaped metal tube 114 which has a shape that corresponds to the shape of the pipe supporting form 38 and which extends over about the same arc as the form. Two or more diagonal stiffeners 116 together with a horizontal stringer 124 maintains the metal tube of the hoop spreader in its desired shape even when subjected to compressive forces.

The hoop spreader is formed so that it contacts the inside of the form at five contact points; a first point 118 at about the intersection between the vertical center plane 108 and the inside of form 37; second and third contact points 120 at the intersection between horizontal center plane 106 and the form inside; and fourth and fifth contact points 122 which are located adjacent the end of the lower form section 110 as is best illustrated in FIG. 6. The remainder of the hoop spreader is free of any substantial contact with the form 38.

Although this hoop spreader provides excellent support for the form while the concrete hardens, which is far superior to the support provided by the prior art spreaders, the spreader is readily removed by simply applying a force in the direction of the pipe axis to the lower stringer 124 of the spreader. This force is sufficient to pivot the spreader about second and third points 120 which immediately disengages the first, fourth and fifth points because of their relatively smaller distance from the pipe center so that only a two-point contact between the spreader and the form exists thereafter. This two-point contact is also readily broken by pulling on one or the other side of the spreader to thereby rotate the spreader about a generally upright axis which disengages the second and third contact points 120 from the form and thereby loosens the hoop spreader as well as the form for their removal from the pipe.

I claim:

1. Apparatus for forming a continuous length of concrete pipe in an open trench by pouring fresh concrete and giving it a tubular shape before it hardens, the apparatus comprising: sled means having forward and aft ends for movement through the trench in a forward direction; interior mold means connected to the sled for pouring fresh concrete thereabout and forming an interior surface of the pipe, the interior mold means being positioned aft of the sled means so that a space is formed between a lower portion of the mold means and a bottom portion of the trench, the space for defining a wall thickness for a lower portion of the pipe; exterior mold means connected to the sled means for shaping an exterior surface of the pipe not in contact with and supporting by walls of the trench; a member reciprocably mounted to the interior mold means for continuously compressing and consolidating freshly poured concrete disposed in the space as the sled means is drawn through the trench and the mold means shapes the pipe; and means for reciprocating the member at a relatively low rate which is insufficient to loosen dirt and sand in the trench or to cause vibrations of the mold means.

2. Apparatus according to claim 1 wherein the reciprocating means includes means for reciprocating the member at a rate of less than about 240 cycles per minute.

3. Apparatus according to claim 1 and including means for reciprocating the member at a rate of no more than about 180 cycles per minute.

4. Apparatus according to claim 3 including means for varying the rate at which the reciprocating means operate.

5. Apparatus according to claim 1 wherein the member comprises a flexible diaphragm in contact with freshly poured concrete, and wherein the reciprocating means includes means for cyclically flexing the diaphragm.

6. Apparatus according to claim 1 wherein the interior mold means includes means defining an enlarged chamber aft of the sled means for receiving fresh concrete, the chamber communicating with the space, and trowel plate means contiguous with the chamber defining means for shaping freshly poured concrete adjacent the trench bottom portion into a lower interior surface of the pipe; and wherein the member comprises diaphragm means attached to the chamber defining means and having a surface in contact with freshly poured concrete in said chamber, and wherein the reciprocating means comprises means for cyclically flexing the diaphragm into and out of the chamber to thereby cyclically compress concrete in the chamber.

7. Apparatus according to claim 6 wherein the cyclic flexing means comprises connecting rod means attached to a center portion of the diaphragm means, and means for reciprocating the connecting rod means to thereby cyclically flex the diaphragm means.

8. Apparatus according to claim 7 wherein the reciprocating means includes means for moving the connecting rod means a total of no more than about one and one-half inches in a direction perpendicular to the diaphragm means.

9. Apparatus according to claim 8 including a plurality of pumping and agitating means attached to the chamber defining means.

10. Apparatus for forming a continuous concrete pipe in an open trench having upright sides and a generally concave bottom, the apparatus comprising: sled means for movement through the trench in a forward direction; interior mold means connected to and trailing the sled means for shaping an interior surface for the pipe, the mold means being spaced from the sides and the bottom to define a space into which fresh concrete for the pipe is placed; means for pouring fresh concrete about the interior mold means; and exterior mold means connected to and trailing the sled means and disposed above and spaced from the interior mold means for shaping an exterior surface of the pipe not supported by the sides and the bottom of the trench, the exterior mold means including laterally spaced-apart mold guide surfaces positioned to substantially simultaneously engage sides of the trench as the sled means in drawn therealong, the guide surfaces having a sufficient vertical extent to center the mold means with respect to the trench; whereby relative lateral movements between the mold means and the trench are eliminated and corresponding variations in a wall thickness of the finish formed pipe are prevented.

11. Apparatus according to claim 10 wherein the trench has a width substantially equal to a desired inside diameter for the finished pipe plus twice the desired wall thickness of the pipe plus no more than about one inch.

12. Apparatus according to claim 11 wherein the surface is defined by an elongate, straight guide bar rigidly connected to lateral ends of the exterior mold means.

13. Apparatus for forming continuous concrete pipe in an open trench comprising: sled means for movement through the trench; interior mold means connected to the sled means about which fresh concrete is poured for forming an interior surface of the pipe, the interior mold means comprising a mandrel connected to the sled means, and means for supporting successively placed arcuately shaped forms on the mandrel and for moving the forms relative to the mandrel as pipe is poured so that the forms remain stationary relative to the freshly poured concrete pipe and thereafter support an upper portion of the pipe until the concrete sets and hardens, the form supporting and moving means comprising a multiplicity of rollers engaging and supporting the forms as they move relative to the mandrel until the forms leave the mandrel, the rollers being arranged in a plurality of roller sets serially positioned over the length of the interior mold means, each set of rollers comprising a plurality of spaced-apart rollers arranged circumferentially over at least about an upper half of the interior mold means, the distance between a center of the interior mold means and the periphery of the rollers being non-uniform so as to cause the formation of a slightly oblong interior pipe surface; means for pouring fresh concrete about the interior mold means; exterior mold means connected to the sled means for shaping an exterior surface of the pipe not supported by walls of the trench; and means in substantially continuous engagement with side walls of the trench for centering the mold means relative to the trench to prevent relative lateral movements between the mold means and the trench and corresponding variations in a wall thickness of the finish formed pipe.

14. Apparatus according to claim 13 wherein the centering means is defined by elongate guide bars attached to portions of the exterior mold means proximate the trench side walls.

15. Apparatus according to claim 13 wherein the spacing between the center of the interior mold means and rollers positioned proximate a horizontal plane intercepting the center is greater than a spacing between the center and a roller proximate a vertical plane intercepting the center.

16. Apparatus according to claim 15 wherein rollers of each set disposed between horizontal rollers proximate the horizontal plane and vertical rollers proximate the vertical plane intercepting the center of the interior mold means have a periphery spaced from the center by amounts which substantially uniformly decrease from adjacent the horizontal roller to adjacent the vertical roller.

17. Apparatus according to claim 16 including at least one additional roller in each set disposed below the horizontal roller.

18. Apparatus according to claim 17 wherein each additional roller has a periphery spaced from the center which is less than the distance between the horizontal rollers and the center so that the degree of curvature of a form placed over the rollers increases between the horizontal roller and the additional roller relative to the curvature of a remaining portion of the form.

19. Apparatus according to claim 13 wherein the periphery of the rollers is defined by an elastomeric material to prevent the adherence of hardened concrete thereto.

20. Apparatus for forming continuous concrete pipe in an open trench comprising: sled means for movement through the trench; means connected with the sled for pouring fresh concrete into the trench; interior mold means and exterior mold means connected with each other and with the sled means for forming the concrete poured into the trench into pipe having an interior pipe surface and an exterior pipe surface; a portion of the exterior surface being in contact with walls of the trench and a remainder being formed and shaped by the exterior mold means; means in engagement with upright sides of the trench as the sled means moves therealong for guiding the mold means along the trench and for centering the mold means with respect thereto; the interior mold means including a plurality of generally semi-cylindrical forms about which an upper portion of the pipe is poured and which remain in stationary contact with the finish poured pipe until the concrete has set; means carried by the interior mold means for shaping the forms so that a horizontal interior pipe width is slightly greater than a vertical interior pipe height; and spreader means for removably engaging a concave inside of the forms and for maintaining the forms in their generally semi-cylindrical, concrete supporting configuration until the concrete has hardened.

21. Apparatus according to claim 20 wherein the forms comprise relatively thin, arcuately shaped sheets, and wherein the spreader means comprises a rigid, lightweight support member engaging the inside at, at least, three spaced apart points.

22. Apparatus according to claim 20 wherein the three points comprise point lying on a generally horizontal plane through the pipe and on a generally vertical plane through the pipe.

23. Apparatus according to claim 22 wherein the forms extend to below the horizontal plane, and wherein the support member includes means supporting the form at points below the horizontal plane.

24. Apparatus according to claim 23 wherein the points below the horizontal plane are spaced a lesser distance from the center of the pipe than the points on the horizontal plane so that the support member can be removed by pivoting it about the points on the horizontal plane and thereby disengaging the member from engagement with all other points of contact between it and the inside of the form.

25. Apparatus for laying continuous concrete pipe in an open trench comprising:
 sled means for movement through the trench;
 hopper means connected with the sled for receiving fresh concrete and for guiding it into the trench;
 interior and exterior concrete forming means connected to the sled for forming the poured concrete into pipe having a substantially cylindrical interior surface and an exterior surface partially supported by side and bottom walls of the trench and partially formed by the exterior forming means;

means disposed between each trench side wall and the interior forming means and positioned beneath the hopper means for flowing fresh concrete from the hopper means about the interior mold means;

a concrete tamper disposed in the concrete flowing means between each trench side wall and the forming means for facilitating the flow of fresh concrete about the interior mold means; and means for reciprocating the tampers along a substantially vertical path, the reciprocating means being wholly disposed below the hopper means and the exterior mold means and comprising a rocker arm having its ends connected with the tampers, a shaft pivotally mounted and connected to the sled means and to the rocker arm and having an axis substantially parallel to the trench, and drive means for pivoting the shaft to thereby impart the reciprocating motion to the tampers.

26. Apparatus according to claim 25 wherein the drive means comprises a variable speed motor so that the rate of reciprocating tamper movement can be adjusted in accordance with the wetness of the concrete poured into the hopper.

27. Apparatus according to claim 24 wherein the hopper is carried by the support structure, a highest point of the support structure protruding no more than about 4 inches above a highest point of the finished concrete pipe, and including means demountably securing the hopper means to the support structure for removal of the hopper means from the support structure so that the apparatus can move in the trench beneath trench crossing utility lines and the like.

* * * * *